United States Patent
Chauhan et al.

(10) Patent No.: US 11,700,259 B2
(45) Date of Patent: Jul. 11, 2023

(54) AUTHENTICATION AND TRACKING SYSTEM FOR SECONDARY USERS OF A RESOURCE DISTRIBUTION PROCESSING SYSTEM

(71) Applicant: BANK OF AMERICA CORPORATION, Charlotte, NC (US)

(72) Inventors: Sandeep Kumar Chauhan, Miyapur Hyderabad (IN); Rajesh Balireddy, Telangana (IN); Barath Cuddalore Sridhar, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 286 days.

(21) Appl. No.: 16/941,850

(22) Filed: Jul. 29, 2020

(65) Prior Publication Data
US 2022/0038462 A1 Feb. 3, 2022

(51) Int. Cl.
*H04L 29/06* (2006.01)
*G06F 9/50* (2006.01)
*H04L 9/40* (2022.01)

(52) U.S. Cl.
CPC .......... *H04L 63/101* (2013.01); *G06F 9/5011* (2013.01); *H04L 63/083* (2013.01)

(58) Field of Classification Search
CPC ..... H04L 63/101; H04L 63/083; H04L 41/28; H04L 63/0838; H04L 63/0861; H04L 63/0876; G06F 9/5011; G06Q 20/00
USPC .......................................................... 726/7
See application file for complete search history.

(56) References Cited

U.S. PATENT DOCUMENTS

| | | | |
|---|---|---|---|
| 9,832,192 B2 * | 11/2017 | Alonso Cebrian | H04L 63/0838 |
| 10,275,956 B1 * | 4/2019 | Gehret | G07C 9/22 |
| 11,334,882 B1 * | 5/2022 | Jameson | H04L 9/3231 |
| 2014/0223516 A1 * | 8/2014 | Vongsouvanh | H04L 63/0815 726/4 |
| 2018/0240208 A1 * | 8/2018 | Cook | G06Q 50/167 |
| 2019/0080309 A1 * | 3/2019 | Goodwin | G06Q 20/401 |
| 2019/0349360 A1 * | 11/2019 | Yeddula | H04L 63/0807 |

OTHER PUBLICATIONS

Federated Identity Architecture of the European eID System, Carretero et al, Jan. 2018 (Year: 2018).*
Scoping security issues for interactive grids, Dwoskin et al, Nov. 2003 (Year: 2003).*

* cited by examiner

*Primary Examiner* — Jahangir Kabir
(74) *Attorney, Agent, or Firm* — Moore & Van Allen PLLC; Nicholas C. Russell

(57) ABSTRACT

Embodiments of the present invention provide a system for authenticating and tracking resource distributions of secondary users. The system is configured for receiving a registration request from a primary user, wherein the registration request is associated with registration of one or more secondary users, in response to receiving the request, generating user credentials for each of the one or more secondary users, associating the user credentials with a primary user identification of the primary user, receiving a resource distribution request from a secondary user of the one or more secondary users, authenticating the secondary user, and processing the resource distribution request based on authenticating the secondary user.

20 Claims, 6 Drawing Sheets

AUTHENTICATION AND TRACKING SYSTEM FOR SECONDARY USERS OF A RESOURCE DISTRIBUTION PROCESSING SYSTEM

BACKGROUND

Conventional systems typically take a lot of time and involve elaborate process to create new resource pools associated with users. Additionally, conventional systems do not allow some users who do not meet eligibility requirements to create new resource pools. As such, there exists a need for a system that efficiently generates new resource pools and also allows users who do not meet eligibility requirements to perform resource distributions.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for authenticating and tracking resource distributions of secondary users. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention receives a request from a primary user, wherein the request is associated with registration of one or more secondary users, in response to receiving the request, generates user credentials for each of the one or more secondary users, associates the user credentials with a primary user identification of the primary user, receives a resource distribution request from a secondary user of the one or more secondary users, authenticates the secondary user, and processes the resource distribution request based on authenticating the secondary user.

In some embodiments, the present invention in response to receiving the resource distribution request from the secondary user, determines that the resource amount associated with the resource distribution request is above a threshold limit and transmits a prompt to a user device of the primary user to approve or deny the resource distribution request.

In some embodiments, the present invention in response to transmitting the prompt, receives an approval of the resource distribution request from the primary user and completes the transfer of resources associated with the resource distribution request.

In some embodiments, the present invention generates a recommendation associated with the threshold limit based on one or more factors and transmits the recommendation to the primary user.

In some embodiments, user credentials comprise at least one of passcode, identifier, biometric information, user device information, and contact information.

In some embodiments, the present invention in response to receiving the resource distribution request, determines that a secondary user identification associated with the resource distribution request matches the user credentials of the secondary user, generates a unique identification combining the primary user identification and the secondary user identification, and tracks processing of the resource distribution request using the unique identification.

In some embodiments, the present invention generates a resource pool summary associated with each of the one or more secondary users and transmits the resource pool summary to the primary user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
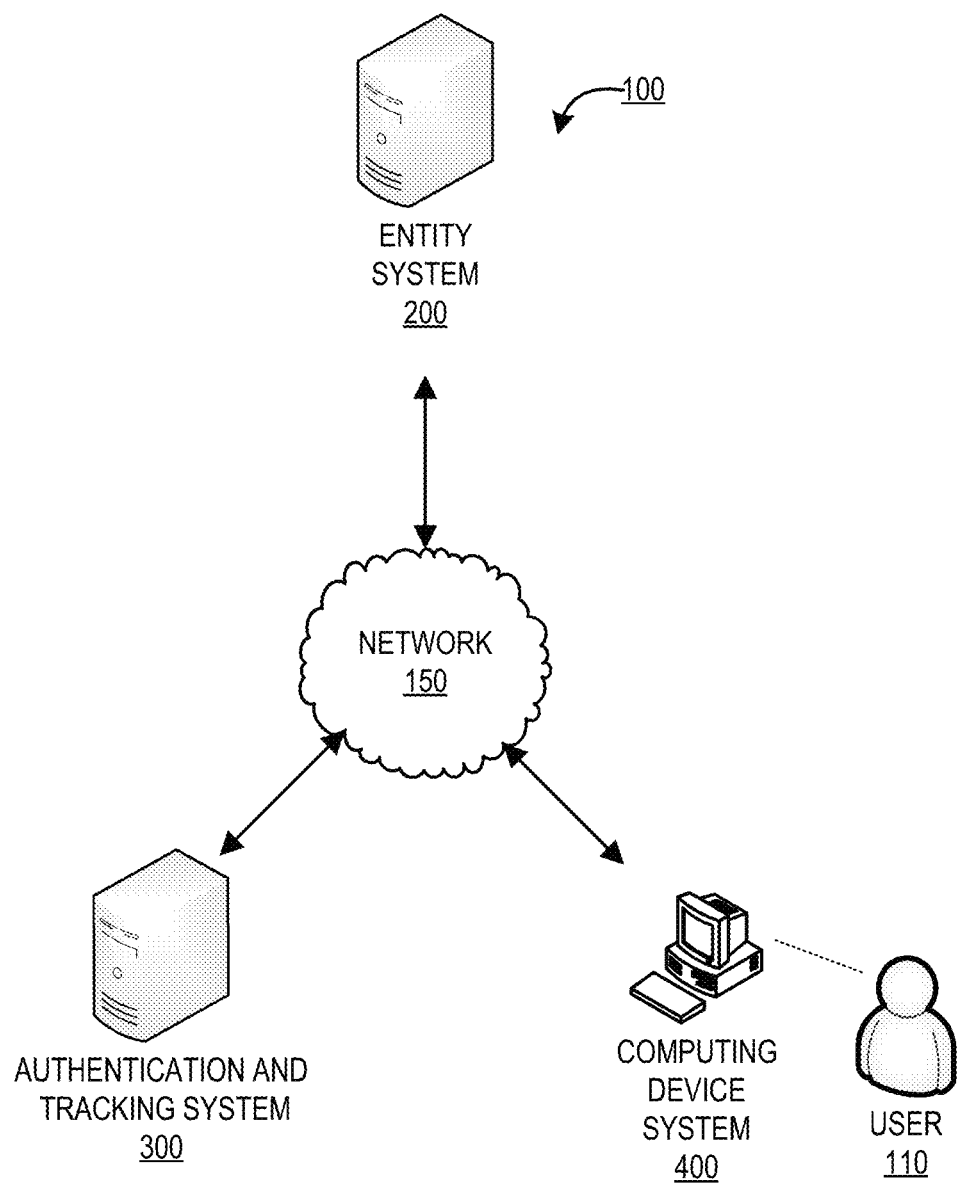
Figure 2:
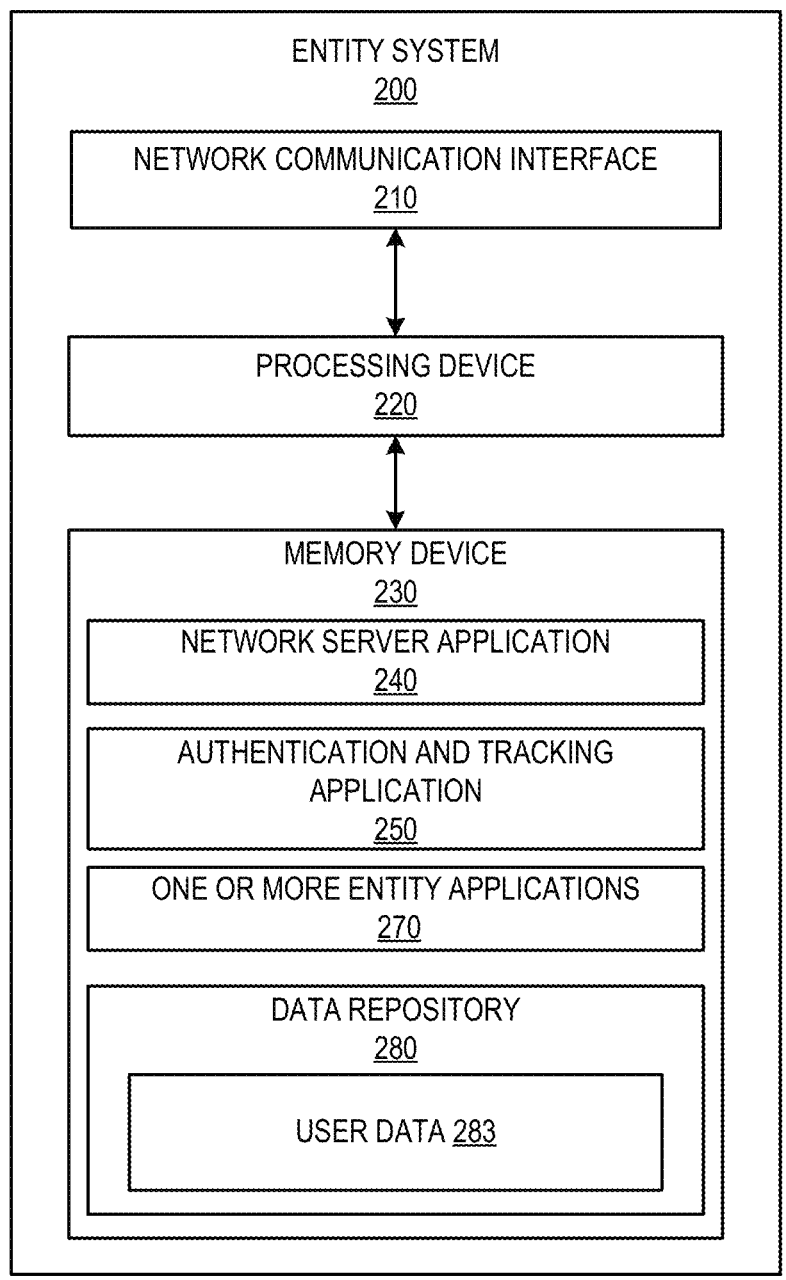
Figure 3:
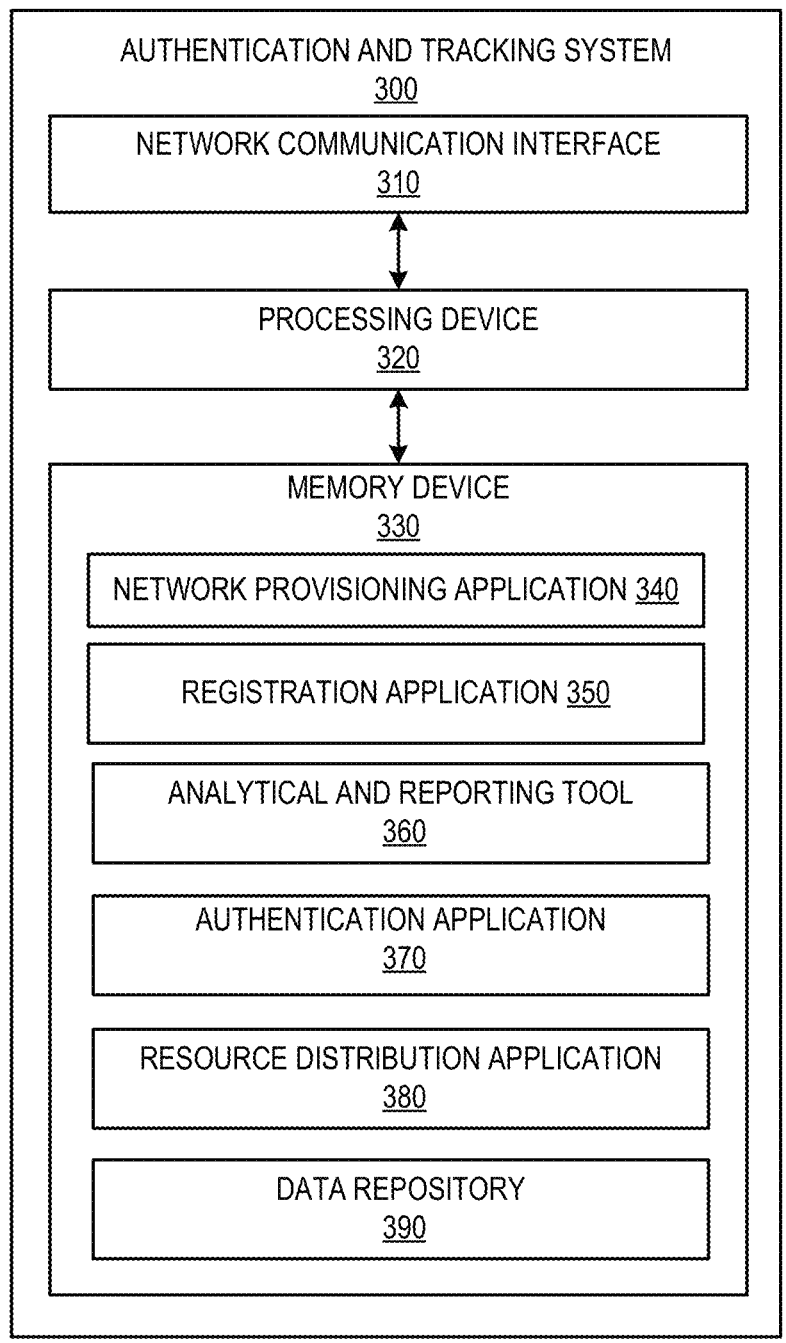
Figure 4:
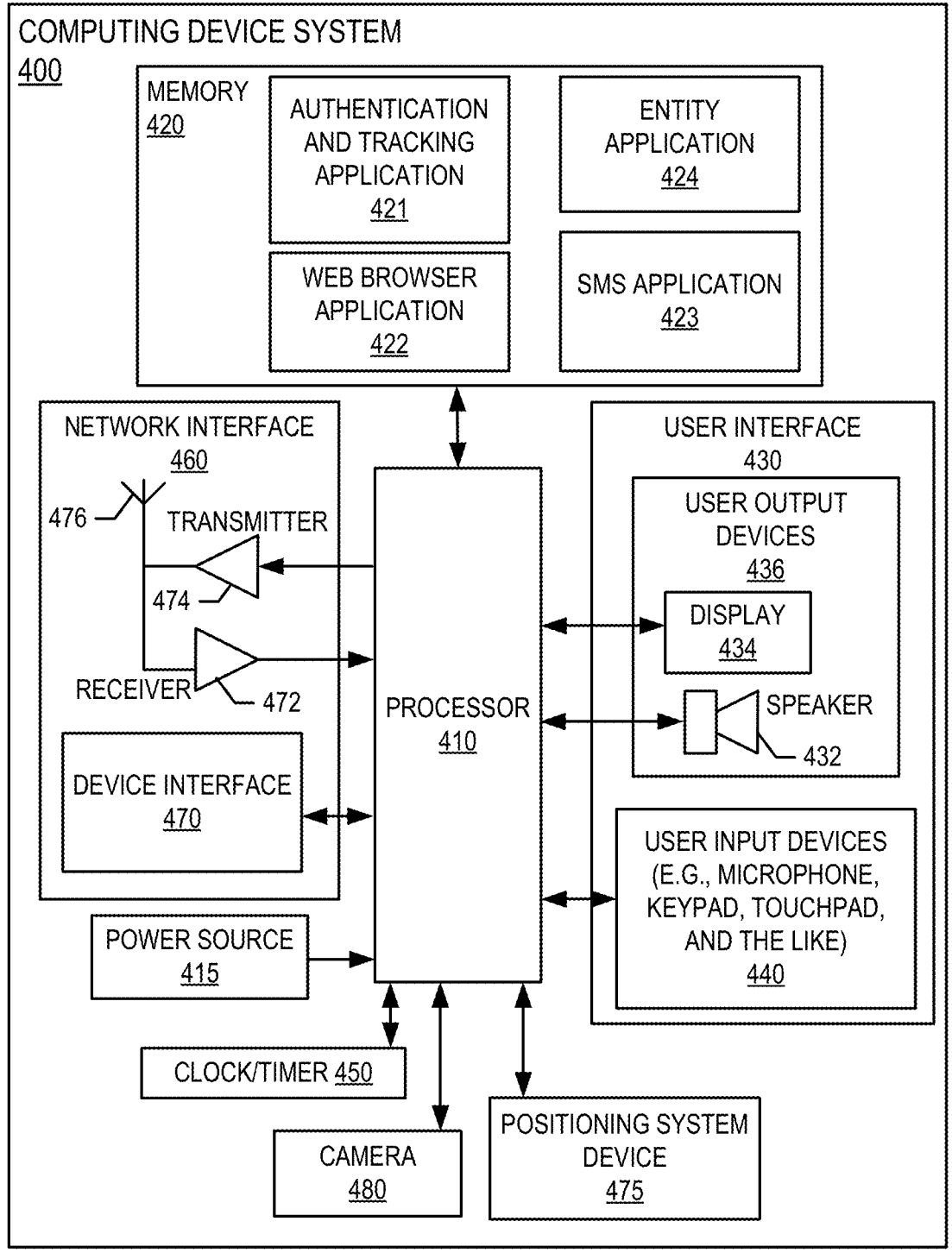
Figure 5:
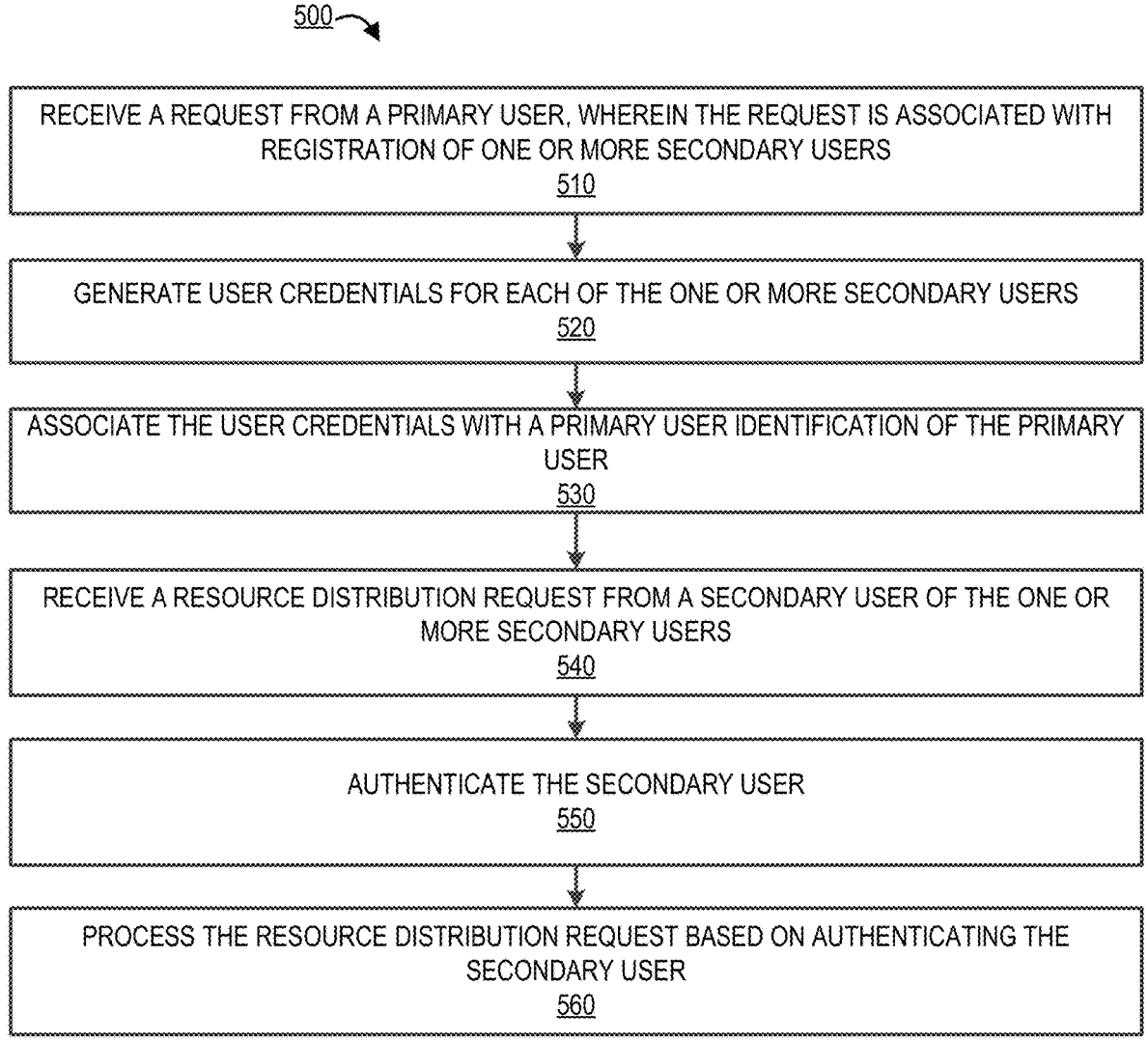
Figure 6:
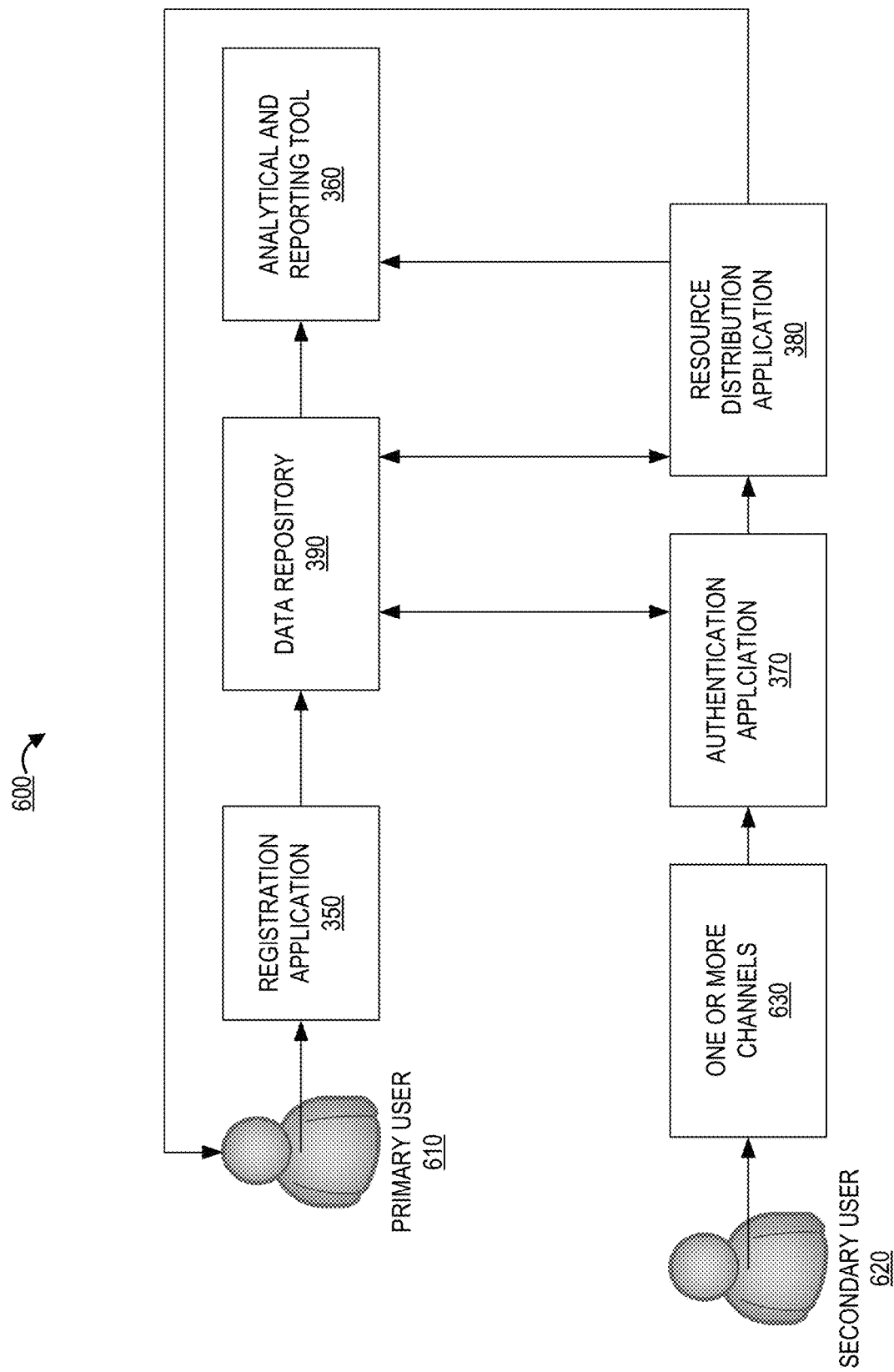

Having thus described embodiments of the invention in general terms, reference will now be made the accompanying drawings, wherein:

FIG. 1 provides a block diagram illustrating a system environment for authenticating and tracking resource distributions of secondary users, in accordance with an embodiment of the invention;

FIG. 2 provides a block diagram illustrating the entity system 200 of FIG. 1, in accordance with an embodiment of the invention;

FIG. 3 provides a block diagram illustrating a authentication and tracking system 300 of FIG. 1, in accordance with an embodiment of the invention;

FIG. 4 provides a block diagram illustrating the computing device system 400 of FIG. 1, in accordance with an embodiment of the invention;

FIG. 5 provides a flowchart illustrating a process flow for authenticating and tracking resource distributions of secondary users, in accordance with an embodiment of the invention; and FIG. 6 provides a block diagram illustrating the process of authenticating and tracking resource distributions of secondary users, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" or "resource entity" may include any organization that process resource distributions (e.g., financial transactions) including, but not limited to, banks, credit unions, savings and loan associations, investment companies, stock brokerages, resource management firms, insurance companies and the like. Furthermore, embodiments of the present invention use the term "user" or "customer." It will be appreciated by someone with ordinary skill in the art that the user or customer may be a customer of the financial institution or a potential customer of the financial institution.

In accordance with embodiments of the invention, a "resource pool" or an "account" is the relationship that a customer has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user information that includes information associated with the user, or the like. The account is associated with and/or maintained by the entity.

In accordance with embodiments of the invention, a "resource interaction" or "resource distribution" may be a transaction, transfer of funds, transfer of resources, and may refer to any activities or communication between a user and an entity, between an entity and a third party system, activities or communication between multiple entities, communication between technology application and the like. Transfer of resources may refer to a payment, processing of funds, international transfer of funds, purchase of goods or services, a return of goods or services, a payment transaction, a credit transaction, or other interactions involving user's resource or account.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

FIG. 1 provides a block diagram illustrating a system environment 100 for authenticating and tracking resource distributions of secondary users, in accordance with an embodiment of the invention. As illustrated in FIG. 1, the environment 100 includes a authentication and tracking system 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers or potential customers of an entity associated with the entity system 200. The entity system(s) 200 may be any system owned or otherwise controlled by an entity to support or perform one or more process steps described herein. In some embodiments, the entity is a financial institution.

The authentication and tracking system 300 is a system of the present invention for performing one or more process steps described herein. In some embodiments, the authentication and tracking system 300 may be an independent system. In some embodiments, the authentication and tracking system 300 may be a part of the entity system 200.

The authentication and tracking system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the authentication and tracking system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the authentication and tracking system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a authentication and tracking application 250, one or more entity applications 270, and a data repository 280 comprising information associated with user data 283. User data 283 may comprise personal information of customers, resource pool information (e.g., transaction data, resource data), Know Your Customer (KYC) information, authentication information, information associated with other personas (e.g., authorized secondary users), resource distribution information associated with other personas, or the like. The computer-executable program code of the network server application 240, the authentication and tracking application 250, the one or more entity application 270 to perform certain logic, data-extraction, and data-storing functions of the entity system 200 described herein, as well as communication functions of the entity system 200.

The network server application 240, the authentication and tracking application 250, and the one or more entity applications 270 are configured to store data in the data repository 280 or to use the data stored in the data repository 280 when communicating through the network communication interface 210 with the authentication and tracking system 300, and/or the computing device system 400 to perform one or more process steps described herein. In some embodiments, the entity system 200 may receive instructions from the authentication and tracking system 300 via the authentication and tracking application 250 to perform certain operations. The authentication and tracking application 250 may be provided by the authentication and tracking system 300. The one or more entity applications 270 may be any applications provided by the entity that allow the users to perform resource distributions.

FIG. 3 provides a block diagram illustrating the authentication and tracking system 300 in greater detail, in accordance with embodiments of the invention. As illustrated in FIG. 3, in one embodiment of the invention, the authentication and tracking system 300 includes one or more processing devices 320 operatively coupled to a network communication interface 310 and a memory device 330. In certain embodiments, the authentication and tracking system 300 is operated by an entity, such as a financial institution. In some embodiments, the authentication and tracking system 300 is owned or operated by the entity of the entity system 200. In some embodiments, the authentication and tracking system 300 may be an independent system. In alternate embodiments, the authentication and tracking system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the authentication and tracking system 300 described herein. For example, in one embodiment of the authentication and tracking system 300, the memory device 330 includes, but is not limited to, a network provisioning application 340, a registration application 350, an analytical and reporting tool 360, an authentication application 370, a resource distribution application 380, and a data repository 390 comprising data processed or accessed by one or more applications in the memory device 330. The computer-executable program code of the network provisioning application 340, the registration application 350, the analytical and reporting tool 360, the authentication application 370, and the resource distribution application 380 may instruct the processing device 320 to perform certain logic, data-processing, and data-storing functions of the authentication and tracking system 300 described herein, as well as communication functions of the authentication and tracking system 300.

The network provisioning application 340, the registration application 350, the analytical and reporting tool 360, the authentication application 370, and the resource distribution application 380 are configured to invoke or use the data in the data repository 390 when communicating through the network communication interface 310 with the entity system 200, and/or the computing device system 400. In some embodiments, the network provisioning application 340, the registration application 350, the analytical and reporting tool 360, the authentication application 370, and the resource distribution application 380 may store the data extracted or received from the entity system 200, and the computing device system 400 in the data repository 390. In some embodiments, the network provisioning application 340, the registration application 350, the analytical and reporting tool 360, the authentication application 370, and the resource distribution application 380 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a authentication and tracking application 421, entity application 424. These applications also typically instructions to a graphical user interface (GUI) on the display 430 that allows the user 110 to interact with the entity system 200, the authentication and tracking system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the authentication and tracking application 421 provided by the authentication and tracking system 300 allows the user 110 to access the authentication and tracking system 300. In some embodiments, the entity application 424 provided by the entity system 200 and the authentication and tracking application 421 allow the user 110 to access the functionalities provided by the authentication and tracking system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow for authenticating and tracking resource distributions of secondary users, in accordance with an embodiment of the invention. As shown in block 510, the system receives a request from a primary user, wherein the request is associated with registration of one or more secondary users. The one or more secondary users may be related to the primary user (e.g., spouse, child, or the like). In some embodiments, the one or more secondary users may be users who do not meet the eligibility requirements (e.g., lifetime of secondary user, resource limit, or the like) to open an individual resource pool (e.g., credit card account, checking account, savings account, or the like). In some embodiments, the request may be initiated by the primary user from an entity application (e.g., online banking application) installed on a user device (e.g., computing device system 400) of the primary user. In some embodiments, the primary user may provide threshold limits associated with spending of each of the one or more secondary users. For example, the primary user may allocate $X to a secondary user 'A' and may allocate $Y to secondary user 'B.'

As shown in block 520, the system generates user credentials for each of the one or more secondary users. The user credentials may comprise passcode, identifier (e.g., user id), biometric information, user device information, and contact information. For example, the system may generate a unique id associated with each of the one or more secondary users. In some embodiments, the system generates the user credentials based on receiving input from the primary user. For example, the primary user may provide an input that the contact information of the secondary user is same as that of the primary user.

As shown in block 530, the system associates the user credentials with a primary user identification of the primary user. For example, the system may tag the user credentials of each of the one or more secondary users with the primary user identification (e.g., user id) of the primary user. In some embodiments, the system may tag the user credentials with KYC documents of the primary user. Associating the user credentials of the one or more secondary users with the primary user identification of the primary user will allow the one or more secondary users to perform resource distributions (e.g., transactions) using the resources (e.g., funds) in the resource pool (e.g., savings account, checking account, or the like) of the primary user.

As shown in block 540, the system receives a resource distribution request from a secondary user of the one or more secondary users. The system may receive a resource distribution request from the secondary user from any of one or more channels (e.g., online banking application, web application, digital wallet, or the like). The resource distribution request comprises a request for transferring resources from the resource pool of the primary user to a third party entity. In some embodiments, the resource distribution request may comprise secondary user information (e.g., device id from which the request was initiated, secondary user identification, or the like).

As shown in block 550, the system authenticates the secondary user. Authentication of the secondary user may comprise validating the secondary user information received along with the resource distribution request with the user credentials. For example, the system may match the secondary user identification received along with the transaction request with the secondary user id generated in block 520. In response to authenticating the user, the system generates a unique identification combining the primary user identification and the secondary user identification and tracks processing of the resource distribution request using the unique identification.

As shown in block 560, the system processes the resource distribution request based on authenticating the secondary user. Processing the resource distribution request comprises verifying that resource amount (e.g., transaction amount) associated with the resource distribution request does not exceed a threshold limit. If the resource amount exceeds the threshold limit allocated to the secondary user, the system transmits a prompt (e.g., notification push, a prompt to enter a onetime password to approve the transaction, or the like) to the user device of the primary user to approve or deny the resource distribution request. If the primary user approves the resource distribution request, the system processes the resource distribution request.

In some embodiments, the system also generates a summary report associated with resource distribution requests initiated by each secondary user and transmits the summary reports to the primary user. In some embodiments, the system generates a recommendation associated with the threshold limit based on one or more factors and transmits the recommendation to the primary user. The one or more factors may include lifetime, historical resource distribution requests, or the like.

FIG. 6 provides a block diagram illustrating the process of authenticating and tracking resource distributions of secondary users, in accordance with an embodiment of the invention. As shown the primary user 610 initiates the registration request associated with the secondary user 620 which is received by the registration application 350. Upon receiving the registration request, the registration application generates user credentials and stores the user credentials in the data repository 390. The secondary user 620 may then initiate a resource distribution request from one or more channels 630, where the resource distribution request is received by the authentication application 370. Upon receiving the resource distribution request, the authentication application 370 authenticates the secondary user 620 based on the user credentials stored in the data repository 390. Once the secondary user is authenticated successfully, the resource distribution application 380 processes the resource distribution request. Processing the resource distribution request comprises verifying that the resource amount associated with the resource distribution request is below the threshold limit based on extracting threshold limit information from the data repository 390. In the case where the resource amount is below the threshold limit, the resource distribution application 380 transfers the resource amount to the third party associated with the resource distribution request. In the case where the resource amount is above the threshold limit, the resource distribution application 380 pushes a prompt to the primary user 610 to approve the resource distribution request. The analytical and reporting tool 360 generates one or more recommendations and summary reports as explained above.

The system of the present invention allows secondary users to perform resource interactions without having to initiate additional processes to open new resource pools. This eliminates the need for multiple servers of the entity systems to process each resource pool opening request associated with the secondary users. Additionally, in the case where the secondary users do not meet the eligibility requirements, the entity system has to typically follow a different process and/or pay extra attention to such users. Therefore, the system of the present invention eliminates the need to initiate separate processes to track such users, which decreases the memory consumption of the entity systems and improves the efficiency of the entity systems.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for authenticating and tracking resource distributions of secondary users, the system comprising:
at least one network communication interface;
at least one non-transitory storage device; and
at least one processing device coupled to the at least one non-transitory storage device and the at least one network communication interface, wherein the at least one processing device is configured to:
receive a registration request from a primary user to register one or more secondary users, wherein the one or more secondary users are related to the primary user, wherein the one or more secondary users do not meet eligibility requirements to open an individual resource pool;
in response to receiving the registration request, generate user credentials for each of the one or more secondary users;
associate the user credentials associated with the one or more secondary users with a primary user identification of the primary user;
tag the user credentials associated with the one or more secondary users with user verification documents of the primary user;
receive a resource distribution request from a secondary user of the one or more secondary users, wherein the resource distribution request is associated with transferring resources from a resource pool of the primary user to a third party entity, wherein the resource distribution request comprises at least a device id associated with initiation of the resource distribution request and secondary user identification information associated with the secondary user;

authenticate the secondary user; and
process the resource distribution request based on authenticating the secondary user.

2. The system of claim 1, wherein the at least one processing device is configured to:
in response to receiving the resource distribution request from the secondary user, determine that resource amount associated with the resource distribution request is above a threshold limit; and
transmit a prompt to a user device of the primary user to approve or deny the resource distribution request.

3. The system of claim 2, wherein the at least one processing device is configured to:
in response to transmitting the prompt, receive an approval of the resource distribution request from the primary user; and
complete the transfer of resources associated with the resource distribution request.

4. The system of claim 3, wherein the at least one processing device is configured to:
generate a recommendation associated with the threshold limit based on one or more factors; and
transmit the recommendation to the primary user.

5. The system of claim 1, wherein the user credentials comprise at least one of passcode, identifier, biometric information, user device information, and contact information associated with the one or more secondary users.

6. The system of claim 4, wherein the at least one processing device is configured to:
in response to receiving the resource distribution request, determine that a secondary user identification associated with the resource distribution request matches the user credentials of the secondary user;
generate a unique identification combining the primary user identification and the secondary user identification; and
track processing of the resource distribution request using the unique identification.

7. The system of claim 1, wherein the at least one processing device is configured to:
generate a resource pool summary associated with each of the one or more secondary users; and
transmit the resource pool summary to the primary user.

8. A computer program product for authenticating and tracking resource distributions of secondary users, the computer program product comprising at least one non-transitory computer-readable medium having computer-readable program code portions embodied therein, the computer-readable program code portions comprises one or more executable portions for:
receiving a registration request from a primary user to register one or more secondary users, wherein the one or more secondary users are related to the primary user, wherein the one or more secondary users do not meet eligibility requirements to open an individual resource pool;
in response to receiving the registration request, generating user credentials for each of the one or more secondary users;
associating the user credentials associated with the one or more secondary users with a primary user identification of the primary user;
tagging the user credentials associated with the one or more secondary users with user verification documents of the primary user;
receiving a resource distribution request from a secondary user of the one or more secondary users, wherein the resource distribution request is associated with transferring resources from a resource pool of the primary user to a third party entity, wherein the resource distribution request comprises at least a device id associated with initiation of the resource distribution request and secondary user identification information associated with the secondary user;
authenticating the secondary user; and
processing the resource distribution request based on authenticating the secondary user.

9. The computer program product of claim 8, wherein the one or more processing devices are configured to execute the computer readable code to:
in response to receiving the resource distribution request from the secondary user, determine that resource amount associated with the resource distribution request is above a threshold limit; and
transmit a prompt to a user device of the primary user to approve or deny the resource distribution request.

10. The computer program product of claim 9, wherein the one or more processing devices are configured to execute the computer readable code to:
in response to transmitting the prompt, receive an approval of the resource distribution request from the primary user; and
complete the transfer of resources associated with the resource distribution request.

11. The computer program product of claim 9, wherein the one or more processing devices are configured to execute the computer readable code to:
generate a recommendation associated with the threshold limit based on one or more factors; and
transmit the recommendation to the primary user.

12. The computer program product of claim 8, wherein the user credentials comprise at least one of passcode, identifier, biometric information, user device information, and contact information associated with the one or more secondary users.

13. The computer program product of claim 12, wherein the one or more processing devices are configured to execute the computer readable code to:
in response to receiving the resource distribution request, determine that a secondary user identification associated with the resource distribution request matches the user credentials of the secondary user;
generate a unique identification combining the primary user identification and the secondary user identification; and
track processing of the resource distribution request using the unique identification.

14. The computer program product of claim 8, wherein the one or more processing devices are configured to execute the computer readable code to:
generate a resource pool summary associated with each of the one or more secondary users; and
transmit the resource pool summary to the primary user.

15. A computer implemented method for authenticating and tracking resource distributions of secondary users, the method comprises:
receiving a registration request from a primary user to register one or more secondary users, wherein the one or more secondary users are related to the primary user, wherein the one or more secondary users do not meet eligibility requirements to open an individual resource pool;

in response to receiving the registration request, generating user credentials for each of the one or more secondary users;

associating the user credentials associated with the one or more secondary users with a primary user identification of the primary user;

tagging the user credentials associated with the one or more secondary users with user verification documents of the primary user;

receiving a resource distribution request from a secondary user of the one or more secondary users, wherein the resource distribution request is associated with transferring resources from a resource pool of the primary user to a third party entity, wherein the resource distribution request comprises at least a device id associated with initiation of the resource distribution request and secondary user identification information associated with the secondary user;

authenticating the secondary user; and processing the resource distribution request based on authenticating the secondary user.

16. The computer implemented method of claim 15, wherein the method further comprises:

in response to receiving the resource distribution request from the secondary user, determining that resource amount associated with the resource distribution request is above a threshold limit; and transmitting a prompt to a user device of the primary user to approve or deny the resource distribution request.

17. The computer implemented method of claim 16, wherein the method further comprises:

in response to transmitting the prompt, receiving an approval of the resource distribution request from the primary user; and completing the transfer of resources associated with the resource distribution request.

18. The computer implemented method of claim 16, wherein the method further comprises:

generating a recommendation associated with the threshold limit based on one or more factors; and transmitting the recommendation to the primary user.

19. The computer implemented method of claim 15, wherein the method further comprises:

in response to receiving the resource distribution request, determining that a secondary user identification associated with the resource distribution request matches the user credentials of the secondary user;

generating a unique identification combining the primary user identification and the secondary user identification; and tracking processing of the resource distribution request using the unique identification.

20. The computer implemented method of claim 15, wherein the method further comprises:

generating a resource pool summary associated with each of the one or more secondary users; and transmitting the resource pool summary to the primary user.

* * * * *